United States Patent
Johnston et al.

(10) Patent No.: US 11,368,588 B1
(45) Date of Patent: Jun. 21, 2022

(54) DYNAMIC COMMUNICATION ROUTING AT CONTACT CENTERS

(71) Applicant: Amazon Technologies, Inc., Seattle, WA (US)

(72) Inventors: Thomas Boyd Johnston, Seattle, WA (US); Pasquale DeMaio, Bellevue, WA (US); Juliana Saussy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/879,411

(22) Filed: May 20, 2020

(51) Int. Cl.
*H04M 3/523* (2006.01)
*G06N 5/04* (2006.01)
*G06N 20/00* (2019.01)

(52) U.S. Cl.
CPC ............ *H04M 3/5232* (2013.01); *G06N 5/04* (2013.01); *G06N 20/00* (2019.01)

(58) Field of Classification Search
CPC ............................ H04M 3/5232; G06N 20/00
USPC .................................................. 379/266.08
See application file for complete search history.

(56) References Cited

U.S. PATENT DOCUMENTS

| | | | | |
|---|---|---|---|---|
| 6,088,441 A | * | 7/2000 | Flockhart | H04M 3/5233 379/265.12 |
| 6,587,831 B1 | * | 7/2003 | O'Brien | G06Q 10/063116 705/7.16 |
| 8,260,649 B2 | * | 9/2012 | Ramanujan | G06Q 30/0202 705/7.22 |
| 10,547,748 B1 | * | 1/2020 | Merritt | H04M 3/4365 |
| 10,778,846 B1 | * | 9/2020 | Petropoulos | G06Q 50/10 |
| 2004/0141508 A1 | * | 7/2004 | Schoeneberger | H04L 67/10 370/401 |
| 2014/0079207 A1 | * | 3/2014 | Zhakov | G06Q 10/0631 379/265.03 |
| 2018/0053401 A1 | * | 2/2018 | Martin | H04L 67/04 |

* cited by examiner

*Primary Examiner* — Ahmad F. Matar
*Assistant Examiner* — Jirapon Intavong
(74) *Attorney, Agent, or Firm* — Lee & Hayes, P.C.

(57) ABSTRACT

This disclosure describes management of a contact center executing in a service provider network. The management may be performed by using one or more trained deep learning/machine learning (ML) models. The ML models may be trained using metrics and data gathered from the various services and systems in the service provider network used to implement the contact center. The trained models may be used for forecasting staffing needs, e.g., agents, for the contact center, scheduling agents, detecting anomalies with regard to customer traffic, e.g., received communications from customers, at the contact center, adherence of agents to the scheduling, and dynamically routing of received communications to appropriate agents (e.g., based on skills of the agent and other factors) for handling of the communications.

20 Claims, 11 Drawing Sheets

DYNAMIC COMMUNICATION ROUTING AT CONTACT CENTERS

BACKGROUND

Contact centers allow for customers to contact businesses and organizations via communications from the customers, which are often in the form of telephone calls; other methods such as chat may be used for customers to contact the contact center. Communications come into the contact center and if an appropriate agent is not available to handle the communication immediately, the communication may be routed to a queue.

Agents may be associated with specific queues and thus, communications may be routed from the queues to an appropriate agent based upon a routing profile defined at the contact center. Communications between customers and agents may be recorded, as well as other data related to incoming communications.

For contact centers, it is necessary to schedule agents to handle communications that come into the contact center from the customers. The scheduling of such agents is generally time consuming and can be labor intensive. For example, some contact centers may have thousands of agents available for scheduling. However, various limitations with respect to certain factors such as, for example, personal schedules of the agents, skills of the agents, rules related to scheduling due to laws where the agent is located, company policy, etc., can make it difficult to schedule agents for handling communications.

Additionally, when communications arrive at the contact centers, it can be important to route the communications to an appropriate queue or queues that are associated with agents that have particular skills. For example, if a communication arrives at the contact center and the communication needs to be handled by an agent who understands French, then the routing of that communication becomes more complicated. Likewise, certain agents may only be able to handle certain types of communications or transactions, e.g., communications related to a return or refund policy of the company. Furthermore, routing of communications may need to be balanced in order to help ensure that agents are not overworked. Overworking of agents often leads to burnout, which can result in a high turnover of agents, thereby causing high costs to the company implementing the contact center due to hiring and training costs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
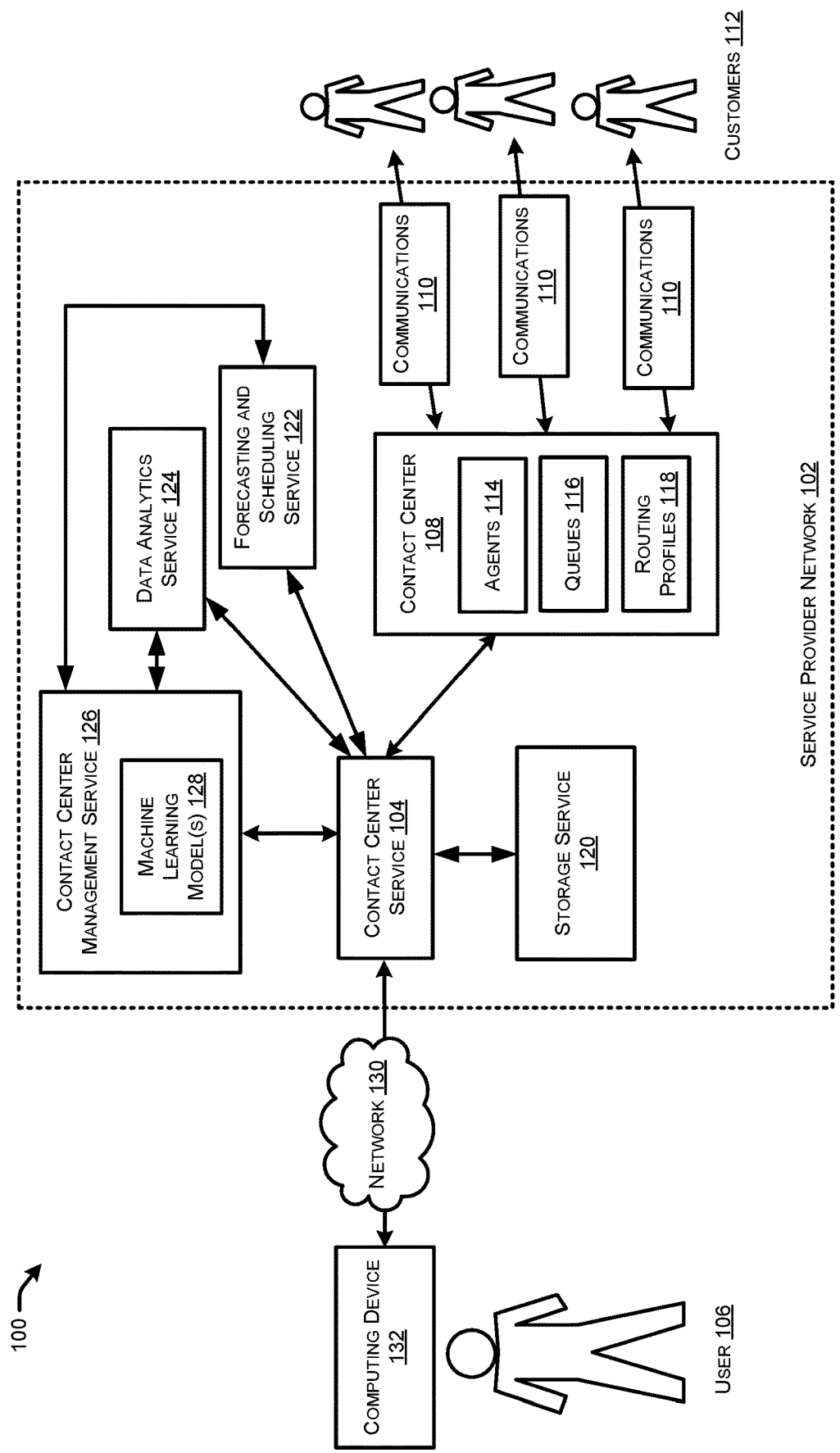
FIG. 1 schematically illustrates a system-architecture diagram of an example environment that includes a contact center service implementing a contact center in a service provider network.

This disclosure describes, at least in part, techniques and architectures to implement and manage systems associated with a contact center executing within a network, e.g., a service provider network. The management of the contact center may be performed by using one or more trained deep learning/machine learning (ML) models. The ML models may be trained using metrics and data (referred to collectively herein as "training data") gathered from the various services and systems in the service provider network used to implement the contact center. The trained ML models may be used for forecasting staffing needs, e.g., agents, for the contact center, scheduling agents, detecting anomalies with regard to customer traffic, e.g., received communications from customers, adherence of agents to the scheduling, and dynamic routing of received communications to appropriate agents for handling of the communications. In configurations, forecasting may include not only the number of incoming contacts, but also the channel (or split between channels), the expected handle times, the amount of after-call/after-contact work, the estimated occupancy of the agents (percentage of working agents available to take contacts, working with a contact, doing after contact work, etc.). The ML models may be used for other features and functions not specifically mentioned herein.

In particular, a contact center may be implemented in the service provider network on behalf of a user, e.g., a company or organization. The contact center may be implemented by a contact center service. The contact center may include multiple queues and one or more agents associated with each queue. Routing profiles may be defined to dynamically link queues to agents. In particular, in configurations, routing may comprise three parts: queues, routing profiles, and contact flows. A queue holds contacts waiting to be answered by agents. A single queue may be used to handle all incoming contacts, or multiple queues may be set up.

Queues may be linked to agents through a routing profile. When a routing profile is created, it may be specified which queues will be in it, whether one queue will be prioritized over another, what channels agents will handle in a contact center control panel, e.g., voice, chat, or both, how many chat conversation agents may handle simultaneously, e.g., up to 5, whether individual queues are for voice, chat, or both, etc. In configurations, each agent may be assigned to only one routing profile. The ML models may continually update the routing profiles based upon data gathered and monitored with respect to the contact center and services used to implement the contact center. If the agent is currently busy, then the call may be routed to a queue for the agent to handle when available. A forecasting and scheduling service may be provided by the service provider network to forecast a volume of expected communications and schedule agents accordingly based upon, for example, the forecast volume of communications to be received from customers, forecast handle times, forecast after-call work, forecast occupancy, etc.

A data analytics service may be provided by the service provider network. The data analytics service may gather and analyze metrics and data related to the contact center. The data analytics service may provide the metrics and data to a contact center management service that may utilize the metrics and data as training data to train a ML model. The ML model may be utilized to assist in the forecasting and scheduling of the agents for the contact center. Thus, the forecasting and scheduling service may be a part of the contact center management service. Likewise, the data analytics service may be part of the contact center management service. In configurations, the contact center management service, forecasting and scheduling service, and/or data analytics service may all be part of the contact center service.

The forecasting and scheduling service (or contact center management service) may utilize the metrics and data and other factors in forecasting a need for agents and for scheduling of agents. For example, factors may include rules defined based on one or more laws of a geographic location of agents. For example, certain geographic locations, e.g., countries, may limit an amount of time an agent may work. Additionally, certain countries may not allow for requesting an agent to work longer than scheduled if it is determined that there is a need for an agent to remain longer, e.g., past the agent's scheduled quitting time. Additionally, company policies may be a factor in scheduling of agents. Other factors may include, for example, personal preferences of the agent, personal schedules of the agents, one or more skills of the agent, an average length of time to handle communications, amount of after-call work, and a number of communications within the queues. Additionally, time of day, day of the week, seasonal considerations, time of the month, etc., may also be pertinent factors in forecasting and scheduling of agents.

Skills of the agent, as previously noted, may also be a factor in forecasting a need for agents and scheduling of the agents. For example, agent skills may include language skills, proficiency with one or more types of actions associated with a queue with which the agent is associated, and a type of communication. For example, some agents may be proficient in French and thus, may be associated with queues where French is a highly desirable skill. Likewise, some agents may be proficient with refunds and/or returns. Thus, such agents may be associated with queues related to those types of transactions. Other skills may include being familiar with handling of text messages versus handling of telephone calls, familiarity with various types of software, hardware, computer systems, functional skills such as, for example, ability to process claims, take orders on a particular promotion, process refunds, process returns, handle fraud claims, ability to work with end-customers vs. vendors, etc., and so on. Agents may have multiple skills, and likewise, queues may be associated with communications where the multiple skills are desirable.

The contact center management service may monitor adherence of agents to their schedules. For example, if agents are scheduled for particular times for a morning break, a lunch break, and an afternoon break, the company may wish the agent to adhere to that schedule based upon skills of the agent. Likewise, training and/or meetings may be scheduled for times when the forecast for receiving communications at the contact center is low. The forecasting and scheduling of agents may also take into consideration a desire for agents to be occupied 80-85% of the time to help prevent burnout of the agents. For example, rather than trying to keep agents occupied 58 minutes per hour, the forecasting and scheduling of agents may attempt to keep scheduled agents occupied about 50 minutes per hour, e.g., in a range of 48 to 51 minutes per hour. Other ranges for keeping agents busy may be targeted as desired. In particular, in configurations, a typical goal may be to keep occupancy around 85%. Occupancy may be defined as the percentage of time that agents or advisors take on call-related activity compared to the logged-in time. "Call-related activity" may cover talk time, hold and after-call work (ACW), etc. Thus, if the contact center has an occupancy of 75%, this may mean that the contact center's advisors may be spending three-quarters of their time doing "call-related activities." Accordingly, while occupancy also may be referred to as "utilization," as used herein, utilization considers total time at work (including training sessions, meetings etc.), while occupancy only considers the time when agents or advisors are active on the contact center floor.

In configurations, the contact center management service may also determine that more agents are required to handle the workload of communications being received at the contact center. Additionally, the contact center management service may determine that more agents with certain skills are needed. This need may be determined by the trained models used by the contact center management service.

The trained models can also be used to quickly detect anomalies with respect to actual volume of communications received at the contact center and the forecast volume of communications received, as well as differences between expected handle time and actual handle time, (or expected after call work and actual after call work). For example, if the trained models determine that a much larger amount of communications are currently being received with respect to the forecast, the contact center management service may provide a notification to a manager or other individual associated with the contact center to contact agents that are currently off duty but have indicated a willingness to work extra hours. Thus, such agents may be contacted to see if they are interested in working to help deal with the increased volume of communications being received. Likewise, if a protracted decrease in the volume of communications received compared to the forecast volume of communications to be received is detected by the trained models, then the contact center management service may provide a notification to the manager indicating that a decrease in the number of agents may be desirable, e.g., allowing some agents to quit work early. The anomalies may be with respect to overall volume or may be with respect to volume of specific communications, e.g., a larger than expected volume of communications related to returns and refunds, types of communications, and/or language specific communications.

In configurations, the deep learning models may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Another example architecture for the deep learning models includes using random cut forest (RCF), which is an unsupervised algorithm. Other architectures and algorithms may be used for the deep learning model if desired.

Thus, by forecasting an expected volume of communications to be received and scheduling an appropriate number of agents with appropriate skills, the contact center may be able to handle communications from customers in an efficient and timely fashion, thereby providing the customers with a good user experience. Likewise, routing of received communications to the appropriate agents and queues can also contribute to an improved user experience for the customers but can also lead to an improved experience for the agents handling the communications. Agents may be more comfortable and interested in the communications they are handling based on receiving communications related to their appropriate skill set. Likewise, adequately controlling the workload of agents can decrease the wait time for customers communicating with the contact center but can also contribute to the work satisfaction of the agents by preventing the agents from being overworked. Needed resources may also be reduced in that calls may be handled more quickly, and often immediately, due to the improved scheduling of agents.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a system-architecture diagram of an example environment 100 that includes an example service provider network 102. The service provider network 102 may comprise servers or hosts, applications, and/or networks (not illustrated) that do not require end-user knowledge of the physical location and configuration of the system that delivers the services. Common expressions associated with the service provider network may include, for example, "on-demand computing," "software as a service (SaaS)," "cloud services," "data centers," and so forth. Services provided by the service provider network may be distributed across one or more physical or virtual devices.

As may be seen in FIG. 1, the service provider network 102 may provide a contact center service 104 that allows a user 106 to implement a contact center 108 for customers or potential customers to contact the user 106. In configurations, the user 106 represents a business or organization and communicates with the service provider network 102 via a network 130 using a computing device 132.

As discussed briefly above, execution of the contact center 108 may allow for customers to contact businesses and organizations via communications 110, generally via telephone calls, but other methods may be used for customers to contact the contact center 108. For example, communications 110 may be in the form of telephone calls, texts, e-mails, chat messages, video messages, voicemails, etc. Also, as another example, the contact center 108 may be configured for contact by customers via text messages and/or web chat. The contact center 108 may be configured for contact by customers via an Internet Protocol (IP) address or an application programming interface (API). A unique application (app) based identifier may be provided to allow for app based access to the contact center 108, rather than by telephone number. Thus, an ingress point for entry into the contact center 108 may be defined in a number of ways, for example through phone calls or by applications, and the described examples herein are not meant to be limiting. For example, calls should not be limited to telephone calls.

Communications 110 come into the contact center 108 from customers 112. The communication 110 may be routed to a queue 116, where it is then handled by an appropriate agent 114 when available. One or more agents 114 may be associated with specific queues 116 and thus, communications 110 may be routed from queues 116 to an appropriate agent 114 based upon a routing profile 118 defined at the contact center 108. As previously noted, in configurations, each agent 114 is assigned to one routing profile 118. In configurations, communications 110 between the customer 112 and an agent 114 may be recorded or otherwise stored, as well as other data related to incoming communications 110, and therefore data storage is generally required for the contact center 108 and may be provided by a storage service 120. In configurations, communications 110 may not be recorded and thus, the storage service 120 may not be needed. However, the user 106 may wish to store data and metrics (referred to collectively herein as "training data") related to communications 110 and thus, may still use the storage service 120. In configurations, data related to communications 110 may be stored by an operator of the service provider network 102, in addition to or instead of the user 106, for a variety of purposes including billing purposes.

A forecasting and scheduling service 122 may be provided by the service provider network 102 to forecast expected communications 110 and schedule agents 114 accordingly based upon the forecast volume of communications 110 to be received from customers 112. The forecasting and scheduling of agents may also include expected contact handle times, after-contact work (e.g., after-call work), etc. A data analytics service 124 may be provided by the service provider network 102. The data analytics service 124 may gather metrics and data related to the contact center 108. In configurations, the data analytics service 124 may analyze the gathered metrics and data. The data analytics service 124 may provide the metrics and data to a contact center management service 126 that may utilize the metrics and data as training data to train one or more deep learning/machine learning (ML) models 128 (referred to herein as "ML models 128"). The use of the ML models 128 will be described further herein.

In configurations, the forecasting and scheduling service 122 may be part of the contact center management service 128. Likewise, the data analytics service 124 may be part of the contact center management service 126. In configurations, the forecasting and scheduling service 122, the data analytics service 124, and/or the contact center management service 126, may be part of the contact center service 108.

The forecasting and scheduling service 122 may utilize the metrics and data from the data analytics service 124 and other factors in forecasting a need for agents 114 based on forecasting anticipated volumes of communications 110 and scheduling of agents 114 in accordance with the anticipated volumes of communications 110. Other factors, for example, may include rules defined based on one or more laws of a geographic location of agents 114. For example, certain geographic locations, e.g., countries, may limit an amount of time an agent 114 may work. Additionally, certain countries may not allow for requesting an agent 114 to work longer than scheduled if it is determined that there is a need for an agent 114 to remain longer, e.g., past the agent's scheduled quitting time. Also, company policies may be a factor in scheduling of agents 114, e.g., limits on hours, overtime, etc. Other factors may include, for example, personal preferences of agents 114, personal schedules of the agents 114, one or more skills of an agent 114, an average length of time for an agent 114 to handle communications 110, and a number of communications 110 within the queues 116. Additionally, time of day, day of the week, seasonal considerations, time of the month, etc., may also be pertinent factors in forecasting anticipated volumes of communications 110 and scheduling of agents 114.

Skills of the agents 144, as previously noted, may also be a factor in forecasting a need for agents 114 and scheduling of the agents 114. For example, agent skills may include language skills, proficiency with one or more types of actions associated with a queue with which the agent is associated, and a type of communication. For example, some agents 114 may be proficient in French and thus, may be associated with queues 116 where French is a highly desirable skill. Likewise, some agents 114 may be proficient with certain types of transactions, e.g., refunds and/or returns. Thus, such agents 114 may be associated with queues 116 related to those types of transactions. Other skills may include being familiar with handling certain types of communications 110, e.g., handling of text messages and/or web chats versus handling of telephone calls. Agents 114 may have multiple skills, and likewise, queues 116 may be associated with communications 110 where the multiple skills are desirable.

As previously noted, in configurations, some of the management of the contact center 108 may be performed by using one or more trained ML model(s) 128. The ML model(s) 128 may be trained using metrics and data gathered by the data analytics service 124 from the various services and systems in the service provider network 102 that are used implement the contact center 108. As will be discussed further herein, the trained ML model(s) 128 may be used by the contact center management service 126 for forecasting anticipated volumes of communications for the contact center 108, scheduling agents 114, detecting anomalies with regard to customer traffic, e.g., received communications 110 from customers 112, at the contact center 108, adherence of agents 114 to the scheduling, and dynamically routing of received communications 110 to appropriate agents 114 and associated queues 16 for handling of the communications 110. The ML model(s) 128 may be used for other features and functions not specifically mentioned herein.

For example, the trained ML model(s) 128 may be utilized to determine that more agents 114 with certain skills are required. For example, more agents 114 may be needed who speak French, can handle the returns/refund process, handle credit card issues, etc. The needed agents 114 may possess one or more needed skills. The trained ML model(s) 128 may also be utilized for anomaly detection, e.g., an anomaly that has resulted in receipt of communications 110 much greater than the forecast volume of received communications 110 during a time period. Likewise, the anomaly may be a decrease in received communications 110 in comparison to the forecast volume of communications 110 to be received during a time period. The trained ML model(s) 128 may take into account various factors such as, for example, skills of the agents 114, geographical location of the agents 114, personal schedules of the agents 114, etc. The trained model(s) 128 may then utilize the forecast and compare what actually occurs, e.g., the volume of communications 110 received, with the forecast volume of communications 110. Queues 116 may be assigned by the ML model(s) 128 to the agents 114 based on the skills of the agents 114, e.g., the queues 116 may be matched with the appropriate agents 114 or the agents 114 may be matched with the appropriate queues 116. Often, agents 114 may have as many as 30 to 35 different skills depending on how skills of the agent 114 are defined. Thus, the trained ML model(s) 128 may be utilized to determine routing of calls dynamically in real time as the communications 110 are received so that the received communications 110 are routed to the appropriate agents 114/queues 116.

In configurations, the ML model(s) 128 may comprise an architecture related to a recurrent neural network, for example, a long short-term memory (LSTM) neural network. LSTM is an artificial recurrent neural network (RNN) architecture used in the field of deep learning. Unlike standard feedforward neural networks, LSTM has feedback connections. It can not only process single data points (such as images), but also entire sequences of data. Another example architecture for the ML model(s) 128 includes using random cut forest (RCF), which is an unsupervised algorithm. Other architectures and algorithms may be used for the deep learning model if desired.

As is known, in configurations, the ML model(s) 128 may be trained based upon historical metrics and data related to the execution of the contact center 108. For example, the ML model(s) 128 may analyze historical metrics and data related to execution of the contact center 108 in the service provider network 102. The historical metrics and data may be based on gathered metrics and data that has been collected over the past six months, one year, or longer by the data analytics service 124. In configurations, the historical metrics and data may have been collected during a period shorter than six months. An operator of the service provider network 102 may determine how long historical metrics and data may be retained, e.g., stored in the storage service 120.

Based upon the analysis of the historical metrics and data by the ML model(s) 128, the ML model(s) 128 may learn to recognize patterns of the metrics and data. The patterns of the metrics and data may indicate a baseline or "normal" operation with respect to metrics and data of the contact center 108 within the service provider network 102. Thus, the metrics and data obtained by the data analytics service 124 generally provides multiple patterns over time.

In configurations, the data analytics service 124 may continually gather metrics and data and may store the metrics and data with the storage service 120. When the contact center management service 126 wants to train the ML model(s) 128, the contact center management service 126 may retrieve the historical metrics and data from the storage service 120 to use as training data to train the ML model(s) 128.

Once the ML model(s) 128 have been trained, when the contact center 108 is executing within the service provider network 102, the data analytics service 122 may collect metrics and data related to implementation and execution of the contact center 108 in the service provider network 102. Based on the metrics and data collected, the data analytics service 122 may provide the metrics and data to the ML model(s) 128. The ML model(s) 128 of the contact center management service 126 may then analyze the metrics and data for the various functions described herein.

Figure 2:
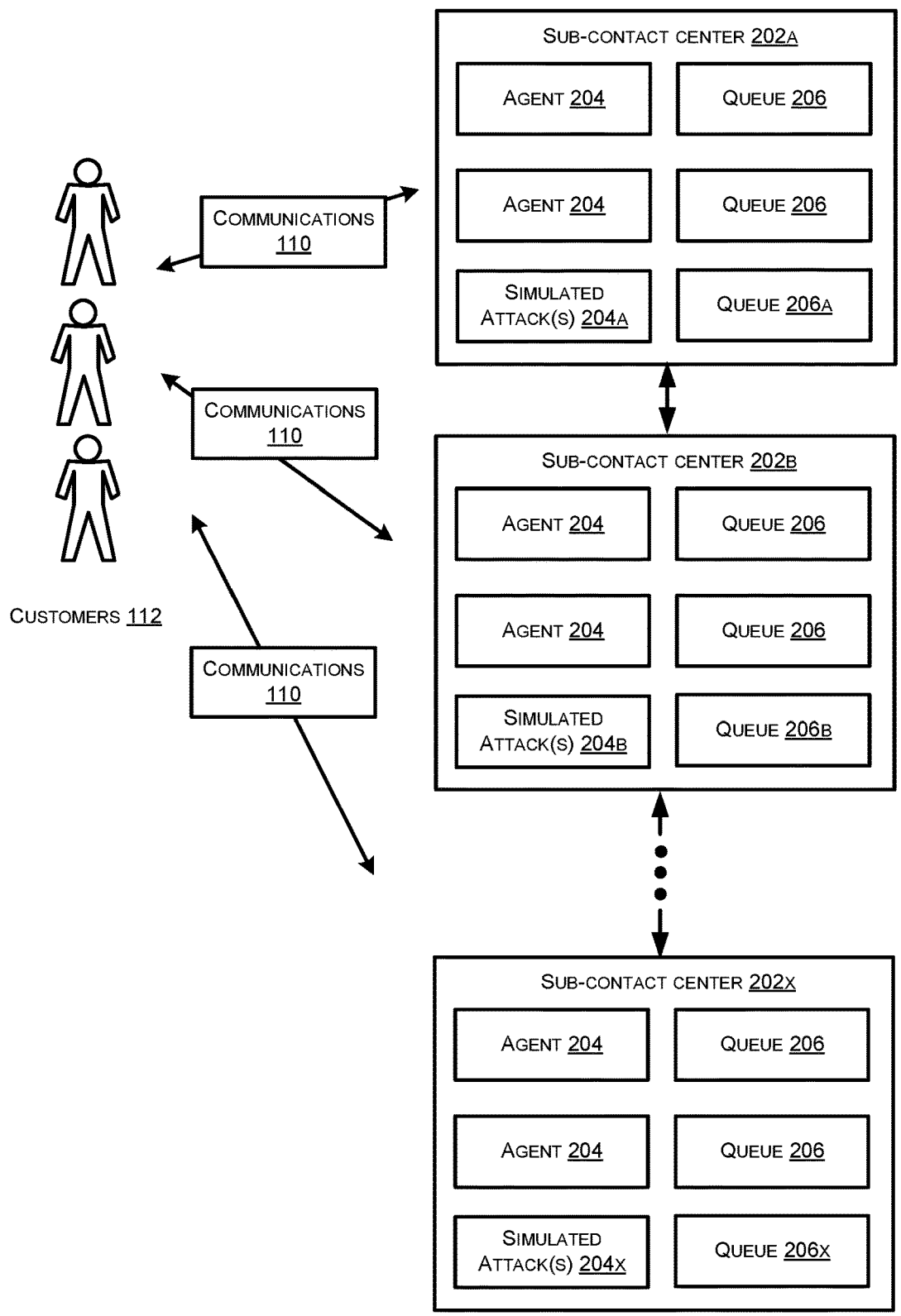
FIG. 2 schematically illustrates an example of the contact center of FIG. 1 handling communications received from customers.

FIG. 2 schematically illustrates an example of the contact center 108 handling communications 110 received from customers 112. As can be seen, the contact center 108 comprises multiple sub-contact centers 202a-202x (referred to herein collectively as "sub-contact centers 202"). The sub-contact centers 202 include agents 204, similar to agents 114, and associated queues 206, similar to queues 116.

The sub-contact centers 202 may have different phone numbers for receiving calls from different geographical locations. Thus, if the communications 110 are phone calls, the customers may call in to contact center 202a. Based upon the factors associated with the received call, the received call is routed to the appropriate agent, e.g., agent 204a. If the agent 204a is currently unavailable, then the call may be placed into a queue associated with the agent 204a, e.g., queue 206a, for handling when the agent 204a is free.

However, as agents' shifts may be expiring or breaks may be taken by certain agents, the incoming communication 110 from a customer 112 may be needed to be routed to a different sub-contact center 202, for example, sub-contact center 202b. For example, if sub-contact center 202a is located in a geographical location, e.g., a country, that limits the ability of the company implementing the contact center 108 to request that agent 204 work longer, then the communication 110 may be routed to contact center 202b. The communication 110 may be routed directly to contact center 202b by the contact center management service 126 or the contact center management service 126 may cause the communication 110 to be routed from the queue 206a in sub-contact center 202a to the appropriate agent, e.g., agent 204b or appropriate queue, e.g., queue 206b, in sub-contact center 202b. Thus, the various sub-contact centers 202 may be redundant in the agents and agent skills that are provided so that communications 110 can be handled appropriately by agents with the appropriate skills regardless of the time of when the communication is received by the contact center.

For example, if the agent 204a is scheduled to end their shift at 5:00 and the average amount of time to handle a communication 110 is six minutes, around 4:50 to 4:54, communication 110 may no longer be routed to that particular agent 204a but rather to another agent 202 having the corresponding skills, either at sub-contact center 202a or 202b. This can help avoid a situation where even though the average time for handling a communication is six minutes, if by chance a communication is routed to agent 204a who is about to end their shift, if the communication takes longer than average, the agent 204a will not end up staying past the end of their shift. Thus, the ML model 128 may continually monitor times for handling communications 110 in order to adapt the routing of messages to appropriate agents/queues at appropriate contact centers. Additionally, if the sub-contact center 202a is nearing closing time or the last remaining agents 204 are nearing quitting time, then the contact center management service 128 may begin routing communications to another sub-contact center 202b or 202x that may just be ramping up with agents 204, or at least still has an hour or more until ramping down.

Likewise, if, for example, agents 204 having particular skills are finished, or close to finished, at sub-contact center 202a, then the contact center management service 126 may begin routing particular communications 110 to different sub-contact centers 202b-202x based on needed agent skills for communications 110. Thus, as previously noted, the contact center management service 126 may use the ML model(s) 128 to dynamically route communications 110 to appropriate agents 204 and/or appropriate queues 206 based on one or more factors including, but not limited to one or more skills of the agent(s) 204, availability of agents 204, rules defined based on one or more laws of a geographic location of the agent(s) 204, company policy of a company implementing the contact center 103 at the service provider network 102, personal preferences of the agent(s) 204, personal schedules of the agent(s) 204, average length of time to handle communications 110 by the agents 204, type of communications 110, and number of communications 110 at the queues 206. In configurations, the factors may be weighted. For example, a top priority may be to route communications 110 based on required skills of an agent 204 to handle the communications while a second priority may be timing and geolocation of the agent 204, e.g., is it close to the end of the agent's shift and is it allowable to have the agent 204 work beyond the end of their shift. Other priorities or weights may include, for example, skills (or lack of skills) of other agents 204 logged in and available, potentially the prior demonstrated ability of an agent 204 to handle the expected type of call/contact that is coming in, forecast demand during that interval, forecast demand during the subsequent interval(s), etc.

Figure 3:
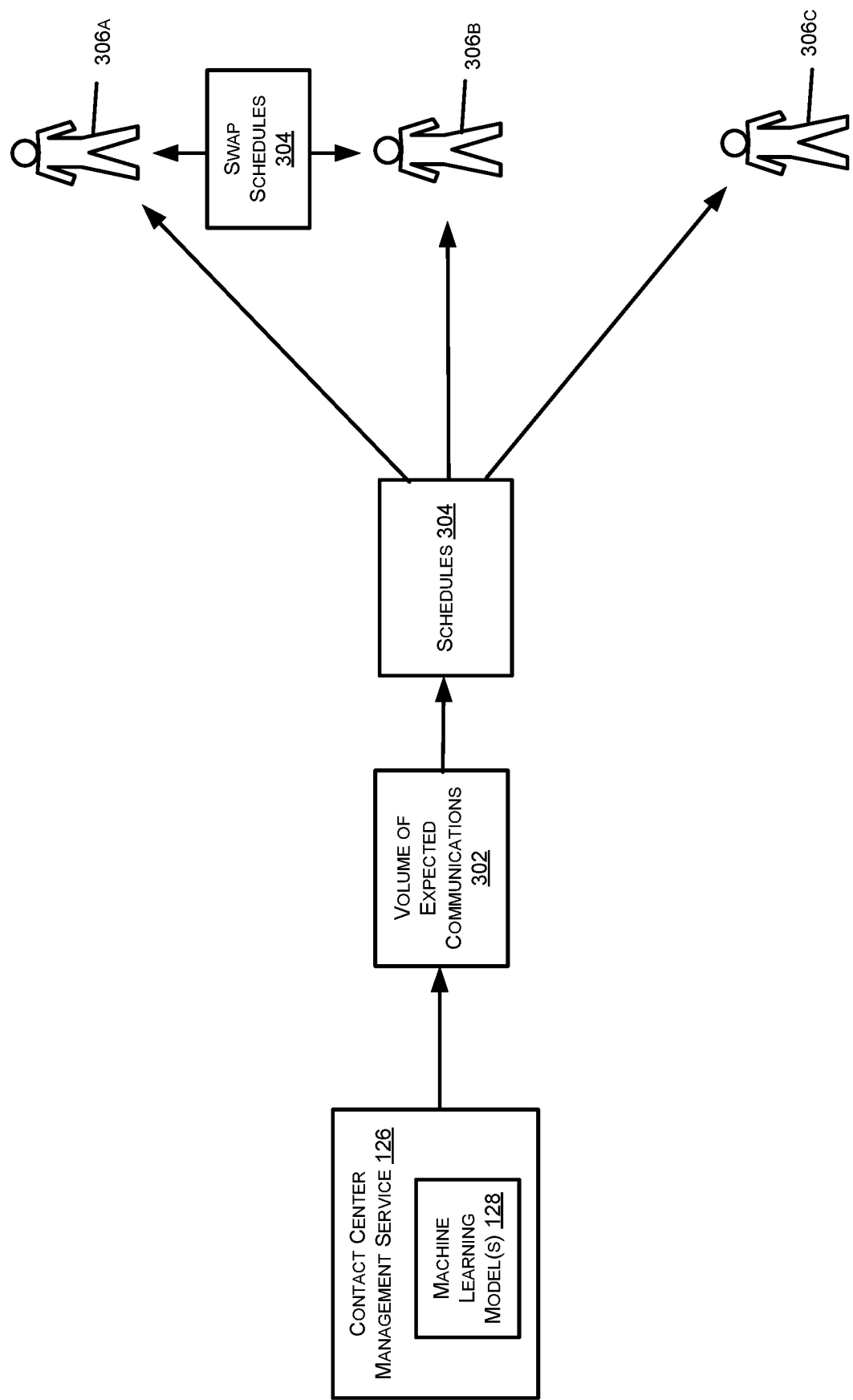
FIG. 3 schematically illustrates an example of the contact center management service of FIG. 1 utilizing ML model(s) to forecast a volume of communications expected to be received during a particular time period or interval and generate schedules.

FIG. 3 schematically illustrates an example of the contact center management service 126 utilizing the ML model(s) 128 to forecast a volume 302 of communications 110 expected to be received during a particular time period or interval and generate schedules 304. The expected volume 302 may be utilized to generate the schedules 304 that schedule an appropriate number of agents 306 (similar to agents 114) for that particular time period. The contact center management system 126 may use the ML model(s) 128 to predict future communication 110 volumes and an average handling time for the different types of communications 110. The contact center management system 126 may generate annual forecasts for agent 306 headcount purposes and update the annual forecasts periodically, e.g., weekly. The contact center management system 126 may divide weekly forecasts into per day/per interval forecasts, and may generate new intra-day forecasts, particularly when the data from early intervals suggests that the forecast for the day is likely to change.

The schedules 304 may be assigned to the agents 306. In configurations, the agents 306 may be provided with the ability to swap schedules 304 among themselves. This information may be utilized by the trained ML model(s) 128 in developing future schedules. For example, if agent 306a routinely swaps with agent 306b, the trained ML model(s) 128 may learn a commonality of factors that leads agent 306a to routinely swap with agent 306b. Additionally, the schedules 304 may take into account personal schedules of the agents 306. For example, certain agents 306 may need to be off their shift in time to pick up children from daycare, school, or various other appointments. Likewise, certain agents 306 may need to begin their shift at a particular time based upon dropping off their children at daycare, school, or various other appointments. The scheduling may also take into account various factors such as desired hours of agents 306. For example, some agents 306 may wish to work more hours while other agents 306 may wish to work less hours.

In configurations, agents 306 may be allowed to select or bid on desired schedules 304 that have been generated by the contact center management service 126 using the trained model(s) 128. For example, the top 20 percent of agents 306 may be allowed to select desired shifts before of the next 20 percent of agents 306. The second 20 percent of agents 306 may then be allowed to select desired schedules 304 ahead of the remaining 60 percent. The remaining 60 percent may then be assigned their schedules 304. As previously noted, agents 306 may be allowed to swap schedules 304. The ranking of the agents may be based upon metrics and factors related to quality of the agents' handling of communications 110, length of service, etc. Also, the use of first 20 percent of agents 306, second 20 percent of agents 306, and remaining 60 percent of agents 306 is merely an example and other combinations may be used if desired.

In particular, the contact center management system 126, using the ML model(s) 128, may propose a series of schedules 304 (example: 4×10 Sunday-Wednesday from 8 am to 6 pm). The contact center management system 126 may allow for the user 106 to validate that these shifts comply with appropriate regulations. Once an appropriate set of schedules 304 is generated, the contact center management system 126 may generate actual assignment of agents 306 to schedules 304, via one or more of schedule bidding, automated schedule assignment, or user 106 assignment. Based upon rules, the contact center management system 126 may automatically approve agent requests for scheduling swapping and personal time off (PTO), or the contact center management system 126 may send such requests to supervisors or managers associated with the user 106 for approval (e.g., for a contact center with 1,000 agents 306, approve the first x % of requests for PTO, then after that require supervisor or manager approval). In configurations, agents 306 may interact with the contact center management system 126, bid on schedules 304, request PTO or schedule swaps and view their schedules on their mobile devices. In configurations, agents 306 may interact with the contact center management system 126 via a web browser that is mobile-friendly.

In configurations, the schedules 304 may also include times at which agents 306 may take breaks. The contact center management service 126 may monitor adherence of the agents 306 to the schedules. For example, it may be important for the agent to take their breaks at the assigned times to ensure that agents 306 having particular skills sets are available for handling of communications 110 received. Thus, the contact center management service 126 may monitor adherence of agents 306 to their schedules 304. For example, if agent 306c is scheduled for particular times for a morning break, a lunch break, and an afternoon break, the company may wish for the agent 306c to adhere to that schedule based upon skills of the agent 306c. Likewise, training and/or meetings may be scheduled for times when the forecast for receiving communications 110 at the contact center 108 is low. Thus, the trained ML model(s) 128 may utilize adherence data in generating the schedules 304. In configurations, the scheduling may also involve scheduling of meetings, training, etc., for agents 306 during periods of time when the forecast volume of communications 110 is low. The contact center management system 126 may further validate compliance (adherence) for individual agents 302 and their schedules 304 in accordance with these additional scheduling functions.

The forecasting of communications 110 to be received and scheduling of agents 306 may also take into consideration a desire for agents 306 to be occupied 80-85% of the time to help prevent burnout of the agents. For example, rather than trying to keep agents 306 busy 58 minutes per hour, the forecasting of communications 110 and scheduling of agents 306 may attempt to keep scheduled agents 306 busy about 50 minutes per hour, e.g., in a range of 48 to 51 minutes per hour. Other ranges for keeping agents 306 busy may be targeted as desired.

Figure 4:
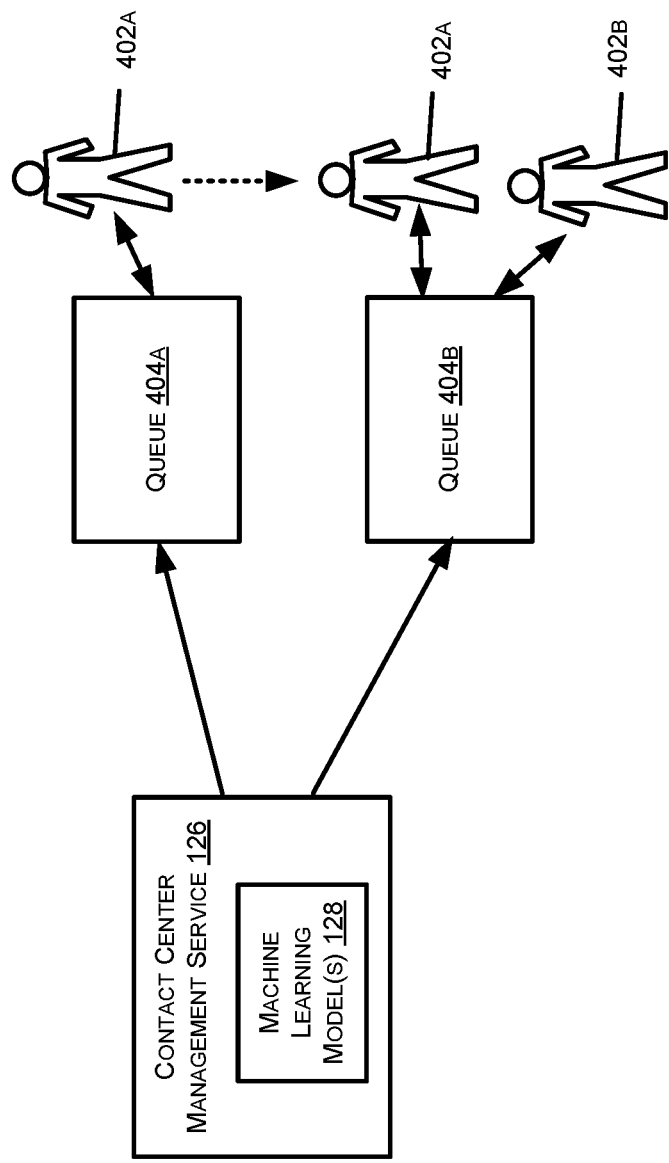
FIG. 4 schematically illustrates an example of the contact center management service of FIG. 1 utilizing ML model(s) to manage agents and queues.

FIG. 4 schematically illustrates an example of the contact center management service 126 utilizing the ML model(s) 128 to manage agents 402 (similar to agents 114) and queues 404 (similar to queues 116). For example, the trained model(s) 128 may determine that agent 402a is not as occupied as expected, e.g., queue 404a is not receiving nearly as many communications 110 as forecast. For example, the received communications 110 may only be 70 percent of the forecast volume. Thus, agent 402a may be reassigned to a different queue 404b based upon the skillset that the agent 402a possesses. For example, if agent 402a speaks French and is able to handle refunds and returns, the agent 402a may be reassigned to queue 404b, which is experiencing a higher volume of communications than forecast, to help agent 402b. Queue 404b may be directed to queuing communications directed to refunds and returns. Thus, the French speaking skill of agent 402a may not be useful for queue 404b, but agent 402a's refunds and returns skills may be useful for communications received at queue 404b. In some configurations, if the agent 402a is not as occupied as expected, the agent 402a may continue to be assigned to queue 404a but communications 110 may be dynamically prioritized by the ML model(s) 128 for routing to queue 404a.

Likewise, in configurations, if the forecast volume for queue 404a is much higher than the actually received volume of communications 110, then queue 404a may be changed to handle a different type of communication 110. For example, queue 404a may become a second queue for handling of communications 110 directed to returns and refunds and agents 402 associated with queue 404a that include that particular skill may continue to be assigned to queue 404a. Those agents 402 that are not skilled in refunds and returns policy may be assigned to a different queue 404 based on their skillset.

Figure 5A:
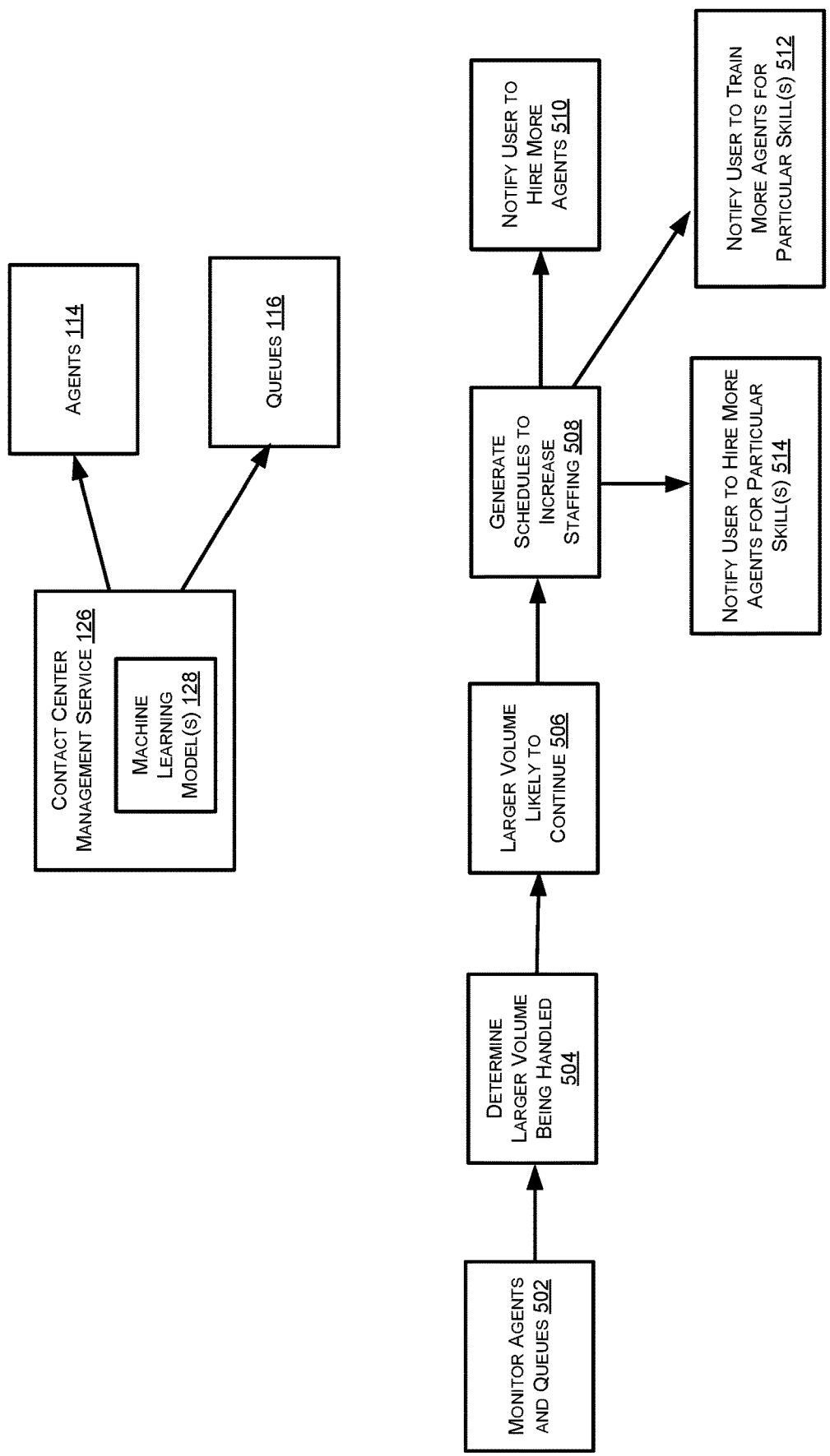
FIGS. 5A and 5B schematically illustrate the contact center management service of FIG. 1 utilizing ML model(s) to monitor agents and/or queues.

FIG. 5A schematically illustrates the contact center management service 126 utilizing the ML model(s) 128 to monitor agents 114 and/or associated queues 116 at 502. The contact center management service 126 may determine, at 504, that certain agents and/or associated queues are more occupied, e.g., handling a larger amount of communications 110 with respect to the forecast volume of communications 110 expected to be received, having longer call handling times, more after call work, etc. Based upon the heavier than occupancy, the ML model(s) 128 may determine, at 506, that the increased occupancy is likely to continue and may revise forecast occupancy, volumes of communications 110 to be received, etc. Thus, the contact center management service 126 may generate schedules 508 to increase staffing at 508. However, there may not be enough available agents 114 to schedule for working at the contact center 108. Therefore, the contact center management service 126 may issue a notification to an operator of the contact center 108 that more agents need to be hired, at 510.

In configurations, the increased occupancy may only be with respect to particular skill(s), e.g., a type of language or a communication transaction type. Thus, the need for additional agents may be a need for more agents 114 with particular skill(s). Accordingly, the contact center management service 126 may send a notification to the operator of the contact center 108 to notify the operator that more agents 114 need to be trained, at 512, with respect to the particular skill(s). Additionally, or alternatively, a notification may be sent, at 514, indicating that the operator needs to hire more agents that have the particular skill(s).

Figure 5B:
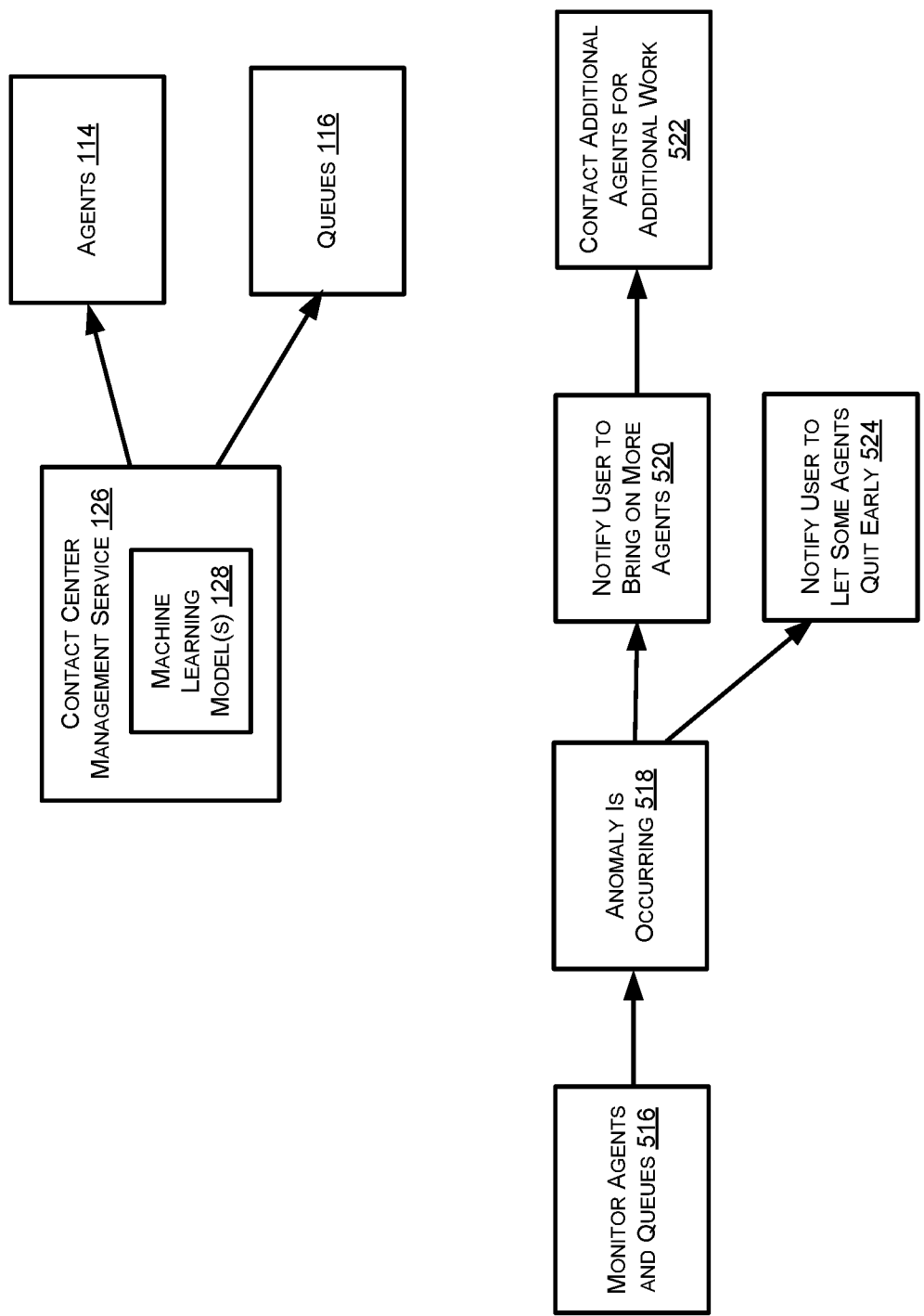

FIG. 5B schematically illustrates the contact center management service 126 utilizing the ML model(s) 128 to monitor agents 114 and/or queues 116 at 516 and determine that an anomaly is occurring at 518. The anomaly may be with respect to a large increase in communication 110 volume received over the forecast volume of communications 110 being received. Thus, at 520 the contact center management service 126 may provide a notification to the operator of the contact center 108 that more agents 114 should be brought on board at to work at the contact center 108. The operator may then, at 522, contact agents 114 who have indicated a desire to work additional or extra hours at the contact center 108 to see if they are available to begin working and handling communications 110 at the contact center 108. Alternatively, the anomaly may be a large decrease in the amount of communications 110 being received with respect to the forecast volume of communications to be received. Thus, at 524 the contact center management service 126 may send a notification to the operator of the contact center 108 indicating that some agents may be allowed to end their shifts early. The ending of the shifts early may be voluntary or, if enough agents 114 do not volunteer, then the ending of the shift early for some agents may be mandatory.

In configurations, the anomalies may be detected by the ML model(s) 128 based, at least in part, upon detection of external factors by the contact center management service 126. For example, the contact center management service 126 may be informed of a weather problem at a local airport. Thus, if the operator of the contact center 108 is a travel agency or airline, then when the increased communications begin to arrive at the contact center 108, the ML model(s) 128 may detect/anticipate the anomaly based upon the external factors, e.g., the increase is temporary and not likely to be permanent. The scenario may also include the ML model(s) 128 detecting a problem at the airport via an increase in communications to the contact center 108, with customers 112 mentioning the problem during the call/communication 110. Likewise, a large reduction in communications 110 received may be due to communication system(s) being down and the ML model(s) 128 may detect/anticipate the anomaly based upon the external factors, e.g., the increase is temporary and not likely to be permanent.

Figure 6:
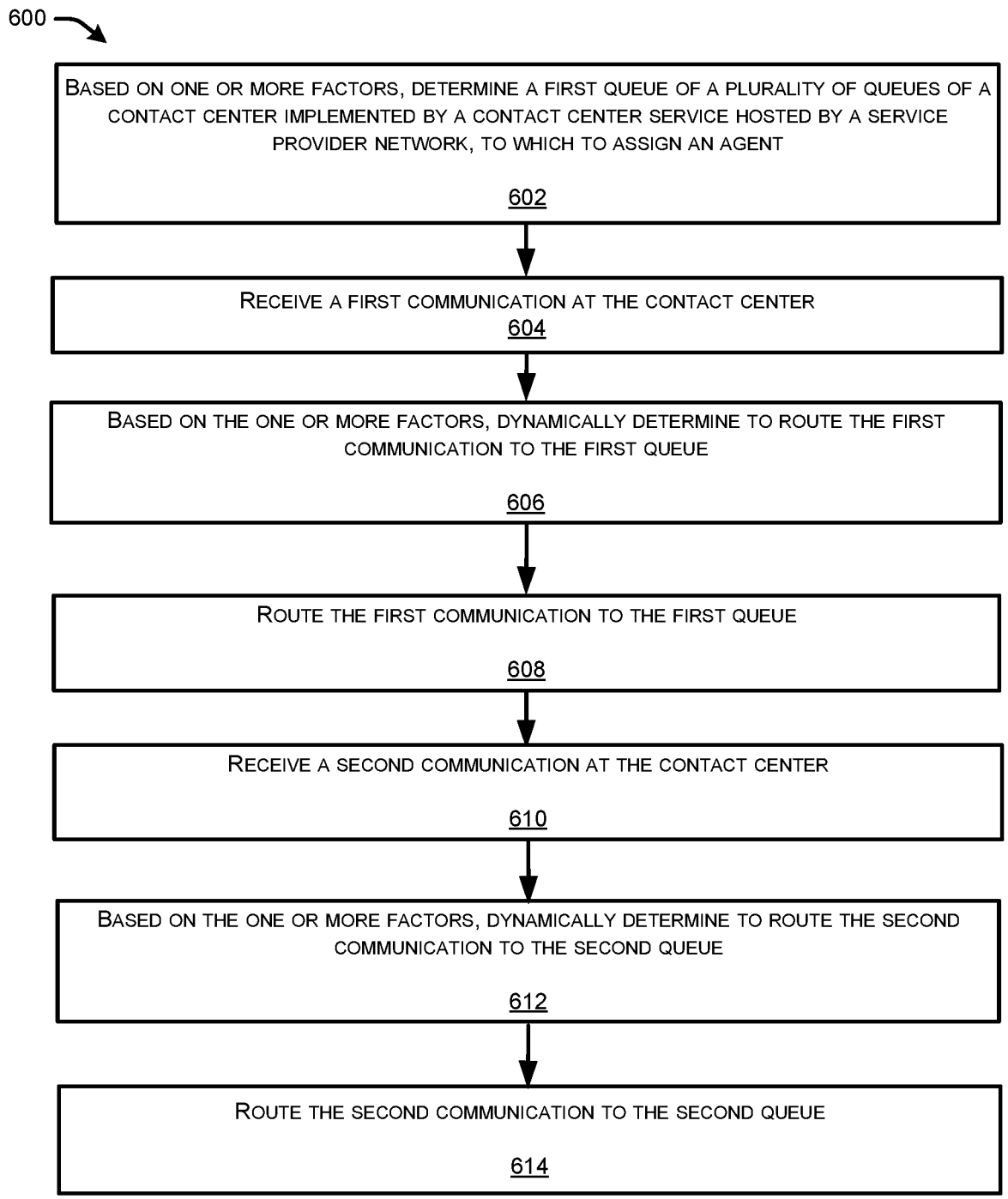
FIG. 6 illustrates a flow diagram of an example method for routing of communications within a contact center implemented in a service provider network executing in the example environment of FIG. 1.

FIG. 6 illustrates a flow diagram of an example method 600 that illustrates aspects of the functions performed at least partly by the service provider network 102 as described in FIGS. 1-5. The logical operations described herein with respect to FIG. 6 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 6 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 6 illustrates a flow diagram of the example method 600 for routing of communications, e.g., communications 110, within a contact center, e.g., contact center 108, implemented in a network, e.g., service provider network 102.

At 602, based on one or more factors, a contact center management service of the service provider network determines a first queue of a plurality of queues of the contact center implemented by a contact center service hosted by the service provider network, to which to assign an agent. For example, the contact center service 104 may implement contact center 108. The contact center 108 may include a plurality of queues 116 that are associated with agents 114. The one or more factors may include, for example, rules defined based on one or more laws of a geographic location of an agent 114, company policy of a company implementing the contact center 108 at the service provider network 102, personal preference of the agent 114, a schedule of the agent 114, one or more skills of the agent 114, average length of time to handle communications 110, and number of communications 110 at the plurality of queues. Based on one or more of the factors, the contact center management service 126 may determine a queue 116 to which to assign an agent 114.

At 604, a first communication is received at the contact center. For example, a communication 110 in the form of a telephone call, text, or a web chat, for example, may be received at the contact center 108 from a customer 112.

At 606, based on the one or more factors, the contact center management service dynamically determines to route the first communication to the first queue. For example, if the communication 110 is a telephone call where the caller (customer 112) speaks French, the contact center management service 126 may dynamically determine to send the call to the agent 114 assigned to the first queue 116 since the agent 114 speaks French.

At 608, the first communication is routed to the first queue. For example, the contact center management service 126 may route the call to the first queue 116, where the agent 114 may handle the call, either immediately or once the agent 114 is available.

At 610, a second communication is received at the contact center. For example, a communication 110 in the form of a telephone call, text, or a web chat, for example, may be received at the contact center 108 from another customer 112.

At 612, based on the one or more factors, the contact center management service dynamically determines to route the second communication to the second queue. For example, if the communication 110 is a telephone call where the caller (customer 112) wishes to obtain a refund, the contact center management service 126 may dynamically determine to send the call to an agent 114 assigned to the second queue 116 since the assigned agent 114 is familiar with returns and refunds.

At 614, the second communication is routed to the second queue. For example, the contact center management service 126 may route the call to the second queue 116, where the agent 114 may handle the call, either immediately or once the agent 114 is available.

Accordingly, the techniques and architectures described herein, the user 106 to better handle unanticipated changes in volume, handle time, or agent adherence. The user 106, and others associated with the user receive ML model(s) 128 based suggestions on diagnosing high or low contact volumes and handle times, as well as after-call work, when to move agents 114 across queues 116, when to offer voluntary time off to agents 114, when to offer overtime (e.g., there's a weather-based emergency (anomaly) and the ML model(s) 128 predict that the agents 114 and queues 116 will be extremely busy), etc. The contact center management service 126, using the ML model(s) 128, may also recommend steps such as increasing the number of agents 114 with a given set of skills via training or additional hiring. Additionally, the contact center management service 126 may recommend or even implement changes to routing profiles 108, workflows, agent management, integrated voice response (IVR) systems, etc. For example, the contact center management service 126 may change the routing profiles 108 to reflect agents' 114 schedules.

The contact center management service 126 and ML model(s) 128 may improve forecast accuracy (better match of headcount of agents 114 required to achieve the target service level), better schedule efficiency (having the right number of agents 114 in all intervals/time periods to achieve the target service level without having idle agents 114 or overworked agents 114), and better adherence, thereby increasing productivity.

While the configurations and examples provided herein have been made with reference to a contact center, it will be appreciated that the techniques and architecture described herein may be used to implement deep learning/machine learning (ML) model training and development for other industries for work force management in general, as well as for other scenarios. For example, the techniques and architectures described herein may be used for work force management in healthcare systems, e.g., scheduling and managing of doctors, nurses, technicians, administrative staff, etc. As another example, the techniques and architectures described herein may be used for work force management in restaurants, e.g., scheduling and managing of chefs, cooks, wait staff, bus staff, dishwashers, delivery personnel, managers, etc. Thus, the automated process for using trained models for work force management improves the functioning of computing devices, e.g., reduces processing time to schedule and manage staff, reduces needed manpower in scheduling and managing a workforce, and in the case of contact centers, more quickly manages agents and associated queues for capacity issues, as well as dynamically routing of communications to appropriate agents and associated queues.

Figure 7:
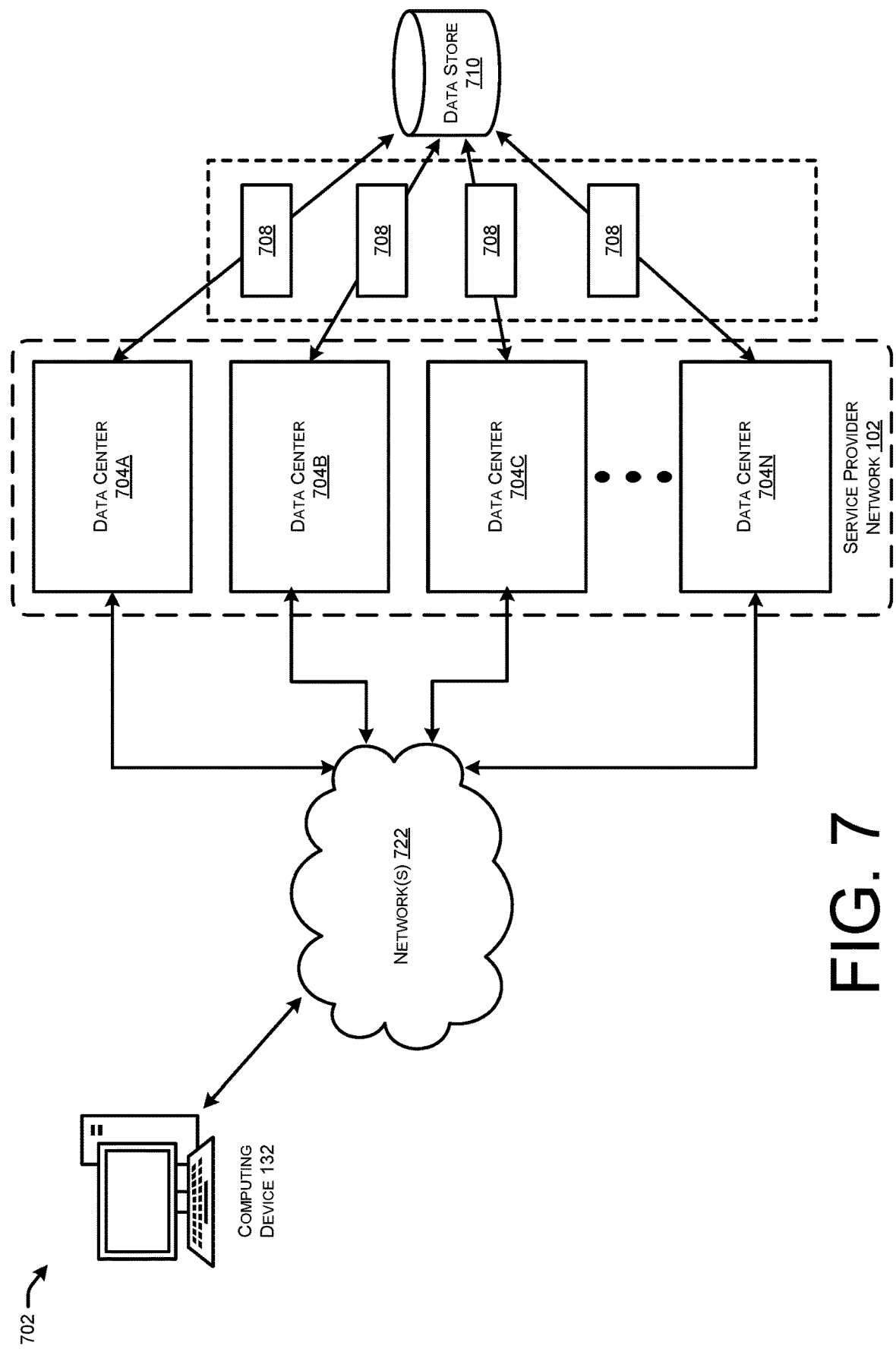
FIG. 7 is a system and network diagram that shows an illustrative operating environment that includes a service provider network that can be configured to implement aspects of the functionality described herein.

FIG. 7 is a system and network diagram that shows one illustrative operating environment 702 for the configurations disclosed herein that includes a service provider network 102 that can be configured to perform the techniques disclosed herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative embodiment for a data center 704 that can be utilized to implement the technologies disclosed herein will be described below with regard to FIG. 8.

The data centers 704 may be configured in different arrangements depending on the service provider network 102. For example, one or more data centers 704 may be included in or otherwise make-up an availability zone. Further, one or more availability zones may make-up or be included in a region. Thus, the service provider network 102 may comprise one or more availability zones, one or more regions, and so forth. The regions may be based on geographic areas, such as being located within a predetermined geographic perimeter.

The user 106 of the service provider network 102 may access the computing resources provided by the service provider network 102 over any wired and/or wireless network(s) 722, which can be a wide area communication network ("WAN"), such as the Internet, an intranet or an Internet service provider ("ISP") network or a combination of such networks. For example, and without limitation, a computing device 132 operated by the user 106 of the cloud-based service provider network 102 may be utilized to access the service provider network 102 by way of the network(s) 722. It should be appreciated that a local-area network ("LAN"), the Internet, or any other networking topology known in the art that connects the data centers 704 to remote customers and other users can be utilized. It should also be appreciated that combinations of such networks can also be utilized.

As shown in FIG. 7, each of the data centers 704 may include computing devices that included software, such as applications that receive and transmit data and handle communications 110. For instance, the computing devices included in the data centers 704 may include software components which transmit, retrieve, receive, or otherwise provide or obtain the data from the storage service 120. For example, the data centers 704 may include or implement the storage service 120.

Figure 8:
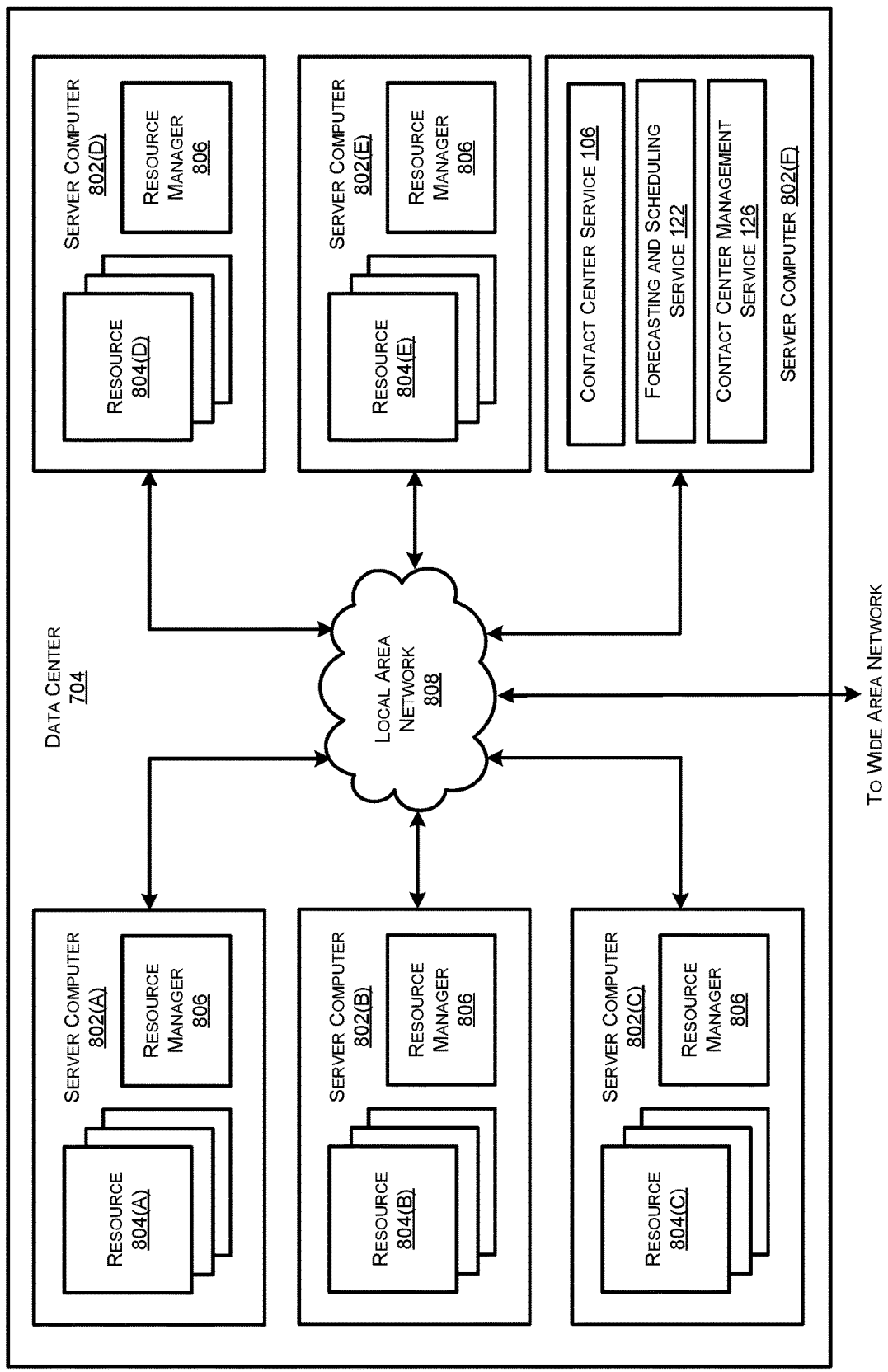
FIG. 8 is a computing system diagram illustrating a configuration for a data center that can be utilized to implement aspects of the technologies disclosed herein.

FIG. 8 is a computing system diagram that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E.

The server computers 802 can be standard tower, rackmount, or blade server computers configured appropriately for providing the computing resources described herein (illustrated in FIG. 8 as the computing resources 804A-804E). As mentioned above, the computing resources provided by the service provider network 102 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 704 can also be configured to provide network services and other types of services, some of which are described in detail below with regard to FIG. 9.

The data center 704 shown in FIG. 8 also includes a server computer 802F that can execute some or all of the software components described above. For example, and without limitation, the server computer 802F can be configured to execute components of the service provider network 102, including the contact center service 106, the forecasting and scheduling service 122, the contact center management service 126, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 704 in various embodiments.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

Figure 9:
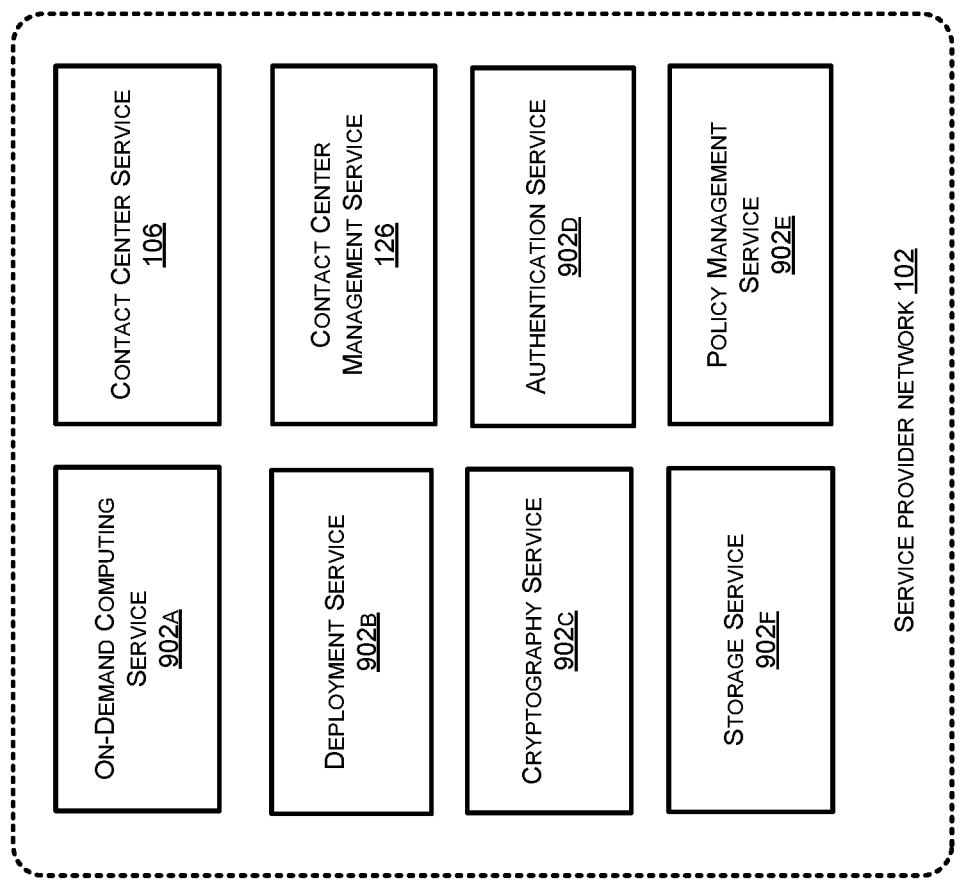
FIG. 9 is a network services diagram that shows aspects of several services that can be provided by and utilized within a system, or a larger system of which the system is a part, which is configured to implement the various technologies disclosed herein.

FIG. 9 is a system and network diagram that shows aspects of several network services that can be provided by and utilized within a service provider network 102 in one embodiment disclosed herein. In particular, and as discussed above, the service provider network 102 can provide a variety of network services to customers and other users of the service provider network 102 including, but not limited to, the contact center service 106 and the contact center management service 126. The service provider network 102 can also provide other types of services including, but not limited to, an on-demand computing service 902A (e.g., processing service 104), a deployment service 902B, a cryptography service 902C, an authentication service 902D, a policy management service 902E, and/or a storage service 902F (e.g., storage service 120), some of which are described in greater detail below. Additionally, the service-provider network 102 can also provide other services, some of which are also described in greater detail below.

It should be appreciated that customers of the service provider network 102 can include organizations or individuals that utilize some or all of the services provided by the service provider network 102. As described herein, a customer or other user can communicate with the service provider network 102 through a network, such as the network 722 shown in FIG. 7. Communications from a customer computing device, such as the user device 110 shown in FIG. 7, to the service provider network 102 can cause the services provided by the service provider network 102 to operate in accordance with the described configurations or variations thereof.

It is noted that not all embodiments described include the services described with reference to FIG. 9 and that additional services can be provided in addition to or as an alternative to services explicitly described. Each of the services shown in FIG. 9 can also expose network services interfaces that enable a caller to submit appropriately configured API calls to the various services through web service requests. In addition, each of the services can include service interfaces that enable the services to access each other (e.g., to enable a virtual computer system provided by the on-demand computing service 902A to store data in or retrieve data from a storage service 9020. Additional details regarding some of the services shown in FIG. 9 will now be provided.

As discussed above, the on-demand computing service 902A can be a collection of computing resources configured to instantiate VM instances and to provide other types of computing resources on demand. For example, a customer or other user of the service provider network 102 can interact with the on-demand computing service 902A (via appropriately configured and authenticated network services API calls) to provision and operate VM instances that are instantiated on physical computing devices hosted and operated by the service provider network 102.

The VM instances can be used for various purposes, such as to operate as servers supporting a web site, to operate business applications or, generally, to serve as computing resources for the customer. Other applications for the VM instances can be to support database applications such as those described herein, electronic commerce applications, business applications and/or other applications. Although the on-demand computing service 902A is shown in FIG. 9, any other computer system or computer system service can be utilized in the service provider network 102, such as a computer system or computer system service that does not employ virtualization and instead provisions computing resources on dedicated or shared computers/servers and/or other physical devices.

A storage service 902F (e.g., storage service 106) can include software and computing resources that collectively operate to store data using block or file-level storage devices (and/or virtualizations thereof) into data store 116, which may be part of the storage service 902F. The storage devices of the storage service 902F, e.g., storage service 120, can, for instance, be operationally attached to virtual computer systems provided by the on-demand computing service 902A to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 902C. The cryptography service 902C can utilize storage services of the service provider network 102, such as the storage service 902F, to store encryption keys in encrypted form, whereby the keys are usable to decrypt customer keys accessible only to particular devices of the cryptography service 902C. The cryptography service 902C can also provide other types of functionality not specifically mentioned herein.

As illustrated in FIG. 9, the service provider network 102, in various embodiments, also includes an authentication service 902D and a policy management service 902E. The authentication service 902D, in one example, is a computer system (i.e., collection of computing resources) configured to perform operations involved in authentication of users. For instance, one of the services 902 shown in FIG. 9 can provide information from a user to the authentication service 902D to receive information in return that indicates whether or not the requests submitted by the user are authentic.

The policy management service 902E, in one example, is a network service configured to manage policies on behalf of customers or internal users of the service provider network 102. The policy management service 902E can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services 902 based, at least in part, on the needs of its customers. For instance, the service provider network 102 can maintain a deployment service 902B for deploying program code and/or a data warehouse service in some embodiments. Other services include object-level archival data storage services, database services, and services that manage, monitor, interact with, or support other services. The service provider network 102 can also be configured with other services not specifically mentioned herein in other embodiments. The service provider network 102 can additionally maintain and provide services described herein, such as the threat detection monitoring service 120 and the model development service. Functionality of these components are described above, and throughout.

Figure 10:
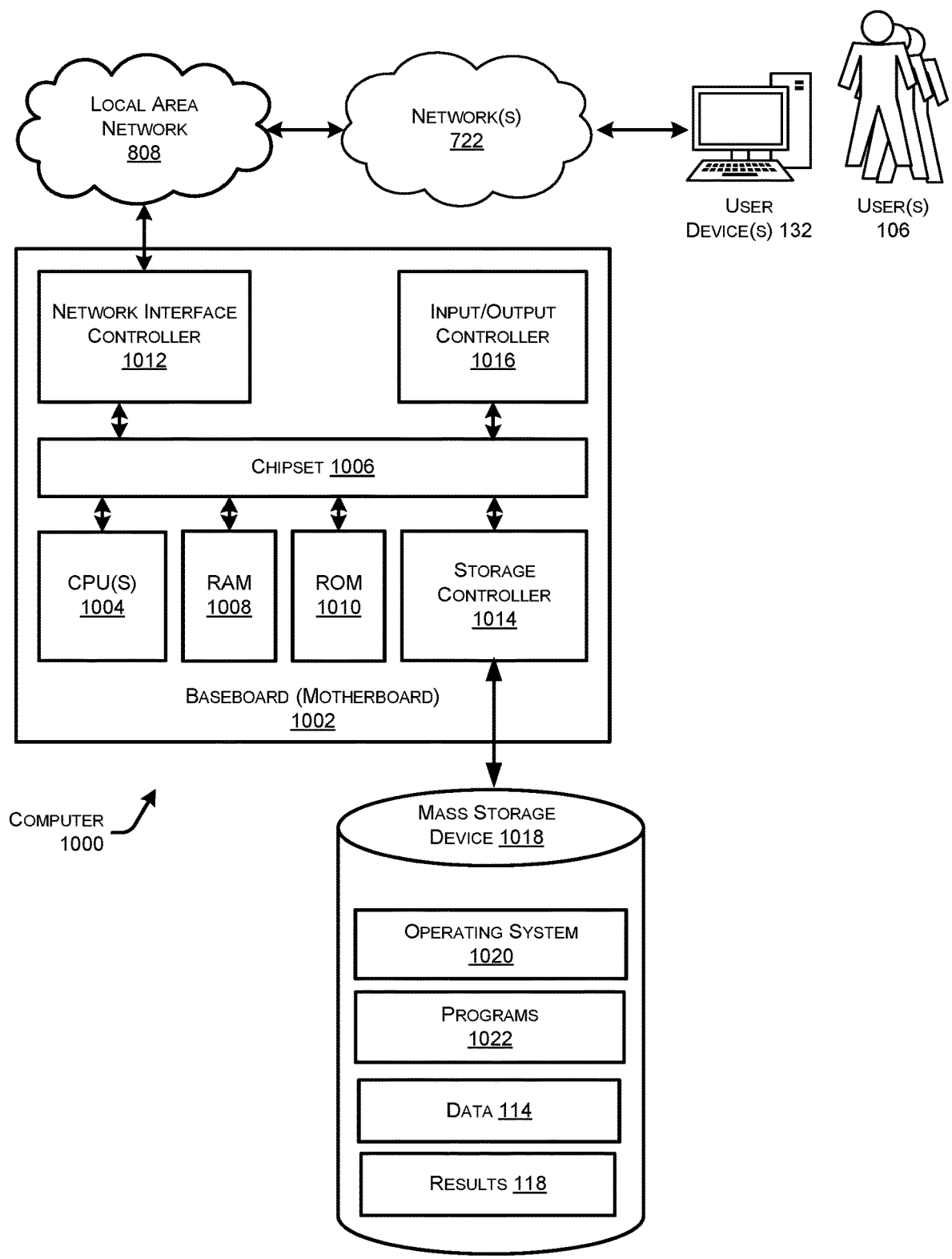
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1008. The chipset 1006 can include functionality for providing network connectivity through a Network Interface Controller (NIC) 1012, such as a gigabit Ethernet adapter. The NIC 1012 is capable of connecting the computer 1000 to other computing devices over the network 1008 (or 722). It should be appreciated that multiple NICs 1012 can be present in the computer 1000, connecting the computer to other types of networks and remote computer systems.

The computer 1000 can be connected to a mass storage device 1018 that provides non-volatile storage for the computer. The mass storage device 1018 can store an operating system 1020, programs 1022 (e.g., agents, etc.), data, applications(s), communications 110, which have been described in greater detail herein. The mass storage device 1018 can be connected to the computer 1000 through a storage controller 1014 connected to the chipset 1006. The mass storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1018 by transforming the physical state of the physical storage units to reflect the information being stored. The specific transformation of physical states can depend on various factors, in different embodiments of this description. Examples of such factors can include, but are not limited to, the technology used to implement the physical storage units, whether the mass storage device 1018 is characterized as primary or secondary storage, and the like.

For example, the computer 1000 can store information to the mass storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 102, and or any components included therein, may be supported by one or more devices similar to computer 1000. Stated otherwise, some or all of the operations performed by the service provider network 102, and or any components included therein, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1018 can store other system or application programs and data utilized by the computer 1000.

In one embodiment, the mass storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-6. The computer 1000 can also include computer-readable storage media having instructions stored thereupon for performing any of the other computer-implemented operations described herein.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

As shown in FIG. 10, the computer 1000 may transmit, receive, retrieve, or otherwise provide and/or obtain data to and/or from the service provider network 102. The computer 1000 may store the communications 110 on the operating system 1020, and/or the programs 1022 that are stored in the storage device 1018 to update or otherwise modify the operating system 1020 and/or the programs 1022.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
   training a machine learning model with training data to generate a trained machine learning model, the training data comprising data related to execution of a contact center in a service provider network;
   predicting, using the trained machine learning model, an expected amount of communications to be received via the contact center during a time period at a future time;
   determining one or more factors for routing of communications to queues of a plurality of queues of the contact center, the one or more factors comprising rules defined based on one or more laws of a geographic location of an agent, a company policy of a company implementing the contact center at the service provider network, a personal preference of the agent, a personal schedule of the agent, one or more skills of the agent, an average length of time to handle communications, after-call work, expected number of calls for a current time interval and subsequent time intervals, or a number of communications at the plurality of queues;
   based on the one or more factors, determining, by a contact center management service of the service provider network and using the trained machine learning model, a first queue of the plurality of queues to which to assign one or more agents;
   receiving, at the contact center, a first communication;
   based on the one or more factors, dynamically determining, by the contact center management service using the trained machine learning model, to route the first communication to the first queue;
   routing the first communication to the first queue; receiving, at the contact center, a second communication;

based on the one or more factors, dynamically determining, by the contact center management service using the trained machine learning model, to route the second communication to a second queue of the plurality of queues of the contact center;

routing the second communication to the second queue;

determining one or more external factors that are external to operation of the contact center;

determining, based at least in part on the one or more external factors, an anomaly with respect to communications received via the contact center by determining that a current amount of communications received via the contact center during the time period is different than the expected amount of communications;

determining whether the anomaly is temporary;

based on determining that the anomaly is temporary, causing transmittal of a notification indicating that the anomaly is temporary to a computing device associated with the contact center.

2. The method of claim 1, further comprising: generating prioritized one or more factors by prioritizing the one or more factors, wherein dynamically determining to route the first communication and the second communication comprises dynamically determining to route the first communication and the second communication based on the prioritized one or more factors.

3. The method of claim 2, wherein the skills of the agent comprise one or more of language skills, proficiency with one or more types of actions associated with the first queue, and a type of communication.

4. The method of claim 1, further comprising:

determining that an actual occupancy of the agent at the first queue is less than a forecasted occupancy of the agent; and based on the one or more factors and the determining that the actual occupancy of the agent at the first queue is less than the forecasted occupancy of the agent, dynamically determining, by the contact center management service using the trained machine learning model, to change assignment of the agent from the first queue to the second queue such that the agent no longer receives communications from the first queue.

5. The method of claim 1, wherein dynamically determining to route the second communication to the second queue of the plurality of queues comprises:

dynamically determining first operating hours of a second geographic location of the contact center associated with the first queue;

dynamically determining second operating hours of a third geographic location of the contact center associated with the second queue; and based on the first operating hours of the second geographic location associated with the contact center and the second operating hours of the third geographic location associated with the contact center, dynamically determining to route the second communication to the second queue of the plurality of queues.

6. A method comprising:

receiving, by a contact center service hosted by a service provider network, a first communication;

based at least in part on one or more factors, determining, by the contact center service, to route the first communication to a first queue of a plurality of queues of a contact center, the one or more factors comprising at least one of:

first rules defined based at least in part on one or more first laws of a first geographic location of a first agent associated with the first queue, second rules defined based at least in part on one or more second laws of a second geographic location of a second agent associated with a second queue of the plurality of queues, one or more company policies of a company implementing the contact center at the service provider network, one or more first personal preferences of the first agent, one or more second personal preferences of the second agent, or a first personal schedule of the first agent, a second personal schedule of the second agent, one or more first skills of the first agent, one or more second skills of the second agent, an average length of time to handle communications, after-call work, expected number of calls for a current time interval and subsequent time intervals, or a number of communications at the plurality of queues;

routing the first communication to the first queue;

receiving, by the contact center service, a second communication;

based at least in part on the one or more factors, determining to route the second communication to the second queue;

routing the second communication to the second queue;

determining one or more external factors that are external to operation of the contact center;

determining, based at least in part on the one or more external factors, that a first actual amount of communications received by the contact center service differs from an expected amount of communications previously predicted to be received by the contact center service;

determining a likelihood that a second actual amount of communications received by the contact center service at a future time period will differ from the expected amount of communications previously predicted to be received by the contact center service; and based at least in part on determining that the second actual amount of communications received by the contact center service at the future time period is likely to differ from the expected amount of communications previously predicted to be received by the contact center service, causing performance of an action associated with the contact center.

7. The method of claim 6, further comprising: training a machine learning model with training data to generate a trained machine learning model, the training data comprising data related to execution of the contact center in the service provider network, wherein determining to route the first communication and the second communication comprises dynamically determining to route the first communication and the second communication using the trained machine learning model.

8. The method of claim 7, wherein the one or more first skills of the first agent and the one or more second skills of the second agent comprise one or more of language skills, first proficiency with one or more first types of actions associated with the first queue, second proficiency with one or more second types of actions associated with the second queue, and a type of communication.

9. The method of claim 6, further comprising: training a machine learning model with training data to generate a trained machine learning model, the training data comprising data related to execution of the contact center in the service provider network;

generating prioritized one or more factors by prioritizing the one or more factors, wherein dynamically determining to route the first communication and the second communication comprises dynamically determining to route the first communication and the second communication using the trained machine learning model and based at least in part on the prioritized one or more factors.

10. The method of claim 6, wherein determining to route the second communication to the second queue of the plurality of queues comprises:

determining first operating hours of a third geographic location of the contact center associated with the first queue;

determining second operating hours of a fourth geographic location of the contact center associated with the second queue; and based at least in part on the first operating hours of the third geographic location associated with the contact center and the second operating hours of the fourth geographic location associated with the contact center, determining to route the second communication to the second queue of the plurality of queues.

11. The method of claim 6, further comprising:
assigning the first agent to the first queue;
assigning the second agent to the first queue;
determining a first schedule and a second schedule;
assigning one of the first schedule or the second schedule to the first agent; and
assigning another of the first schedule or the second schedule to the second agent,
wherein assigning of the first schedule and the second schedule is based at least in part on selection of the first schedule by the first agent or swapping, by the first agent with the second agent, the first schedule for the second schedule.

12. The method of claim 11, wherein assigning of the first schedule and assigning of the second schedule is further based at least in part on one or both of (i) one or more first skills of first agents needed for the first queue or (ii) one or more second skills of second agents needed for the second queue.

13. The method of claim 6, further comprising:
based at least in part on the one or more factors, assigning a first agent to the first queue based at least in part on the one or more factors, and assigning a second agent to the second queue;
determining that an actual occupancy of the first agent at the first queue is less than a forecasted occupancy of the first agent; and
based at least in part on the one or more factors and the determining that the actual occupancy of the first agent at the first queue is less than the forecasted occupancy of the first agent, re-assigning the first agent to the second queue such that the first agent no longer receives communications from the first queue.

14. One or more non-transitory computer-readable media storing computer-executable instructions that, when executed, cause one or more processors to perform operations comprising:

receiving, at a contact center hosted by a service provider network, a first communication;

based at least in part on one or more factors, determining to route the first communication to a first queue of a plurality of queues of the contact center, the one or more factors comprising at least one of first rules defined based at least in part on one or more first laws of a first geographic location of a first agent associated with the first queue, second rules defined based at least in part on one or more second laws of a second geographic location of a second agent associated with a second queue of the plurality of queues, one or more company policies of a company implementing the contact center at the service provider network, one or more first personal preferences of the first agent, one or more second personal preferences of the second agent, a first personal schedule of the first agent, a second personal schedule of the second agent, one or more first skills of the first agent, one or more second skills of the second agent, an average length of time to handle communications, after-call work, expected number of calls for a current time interval and subsequent time intervals, or a number of communications at the plurality of queues;

routing the first communication to the first queue; receiving, at the contact center, a second communication;

based at least in part on the one or more factors, determining to route the second communication to a second queue of the plurality of queues of the contact center;

routing the second communication to the second queue;

determining one or more external factors that are external to operation of the contact center;

determining, based at least in part on the one or more external factors, that a first actual amount of communications received at the contact center differs from an expected amount of communications previously predicted to be received at the contact center;

determining a likelihood that a second actual amount of communications received at the contact center at a future time period will differ from the expected amount of communications previously predicted to be received at the contact center;

based at least in part on determining that the second actual amount of communications received at the contact center at the future time period is likely to differ from the expected amount of communications previously predicted to be received at the contact center, causing performance of an action associated with the contact center.

15. The one or more non-transitory computer-readable media storing computer-executable instructions of claim 14, wherein the operations further comprise:

training a machine learning model with training data to generate a trained machine learning model, the training data comprising data related to execution of the contact center in the service provider network, wherein determining to route the first communication and the second communication comprises dynamically determining to route the first communication and the second communication using the trained machine learning model.

16. The one or more non-transitory computer-readable media storing computer-executable instructions of claim 15, wherein the one or more first skills of the first agent and the one or more second skills of the second agent comprise one or more of language skills, first proficiency with one or more first types of actions associated with the first queue, second proficiency with one or more second types of actions associated with the second queue, and a type of communication.

17. The one or more non-transitory computer-readable media storing computer-executable instructions of claim 15, wherein the operations further comprise:

training a machine learning model with training data to generate a trained machine learning model, the training data comprising data related to execution of the contact center in the service provider network; and generating prioritized one or more factors by prioritizing the one or more factors, wherein dynamically determining to route the first communication and the second communication comprises dynamically determining to route the first communication and the second communication using the trained machine learning model and based at least in part on the prioritized one or more factors.

18. The one or more non-transitory computer-readable media storing computer-executable instructions of claim 14, wherein determining to route the second communication to the second queue of the plurality of queues comprises:

determining first operating hours of a third geographic location of the contact center associated with the first queue;

determining second operating hours of a fourth geographic location of the contact center associated with the second queue; and based at least in part on the first operating hours of the third geographic location associated with the contact center and the second operating hours of the fourth geographic location associated with the contact center, to route the second communication to the second queue of the plurality of queues.

19. The one or more non-transitory computer-readable media storing computer-executable instructions of claim 14, wherein the operations further comprise:

assigning the first agent to the first queue;

assigning the second agent to the first queue;

determining the first schedule and a second schedule;

assigning one of the first schedule or the second schedule to the first agent; and assigning another of the first schedule or the second schedule to the second agent, wherein assigning of the first schedule and the second schedule is based at least in part on selection of the first schedule by the first agent or swapping, by the first agent with the second agent, the first schedule for the second schedule.

20. The one or more non-transitory computer-readable media storing computer-executable instructions of claim 14, wherein the operations further comprise:

based at least in part on the one or more factors, assigning the first agent to the first queue;

based at least in part on the one or more factors, assigning the second agent to the second queue;

determining that an actual occupancy of the first agent at the first queue is less than a forecasted occupancy of the first agent; and based at least in part on the one or more factors the determining that the actual occupancy of the first agent at the first queue is less than the forecasted occupancy of the first agent, re-assigning the first agent to the second queue such that the first agent no longer receives communications from the first queue.

\* \* \* \* \*

UNITED STATES PATENT AND TRADEMARK OFFICE
CERTIFICATE OF CORRECTION

| | |
|---|---|
| PATENT NO. | : 11,368,588 B1 |
| APPLICATION NO. | : 16/879411 |
| DATED | : June 21, 2022 |
| INVENTOR(S) | : Thomas Boyd Johnston et al. |

It is certified that error appears in the above-identified patent and that said Letters Patent is hereby corrected as shown below:

In the Claims

Column 28, Line 6, change "determining the first" to -- determining a first --.

Signed and Sealed this
Eleventh Day of October, 2022

Katherine Kelly Vidal
*Director of the United States Patent and Trademark Office*